(12) United States Patent
Chandler et al.

(10) Patent No.: US 8,007,863 B2
(45) Date of Patent: Aug. 30, 2011

(54) MULTI-LAYER ARTICLES AND METHOD FOR IMPROVING THE RELEASE LIFE OF THE SAME

(75) Inventors: Blake E. Chandler, Woodbury, MN (US); Thomas J. Blong, Woodbury, MN (US); Shannon S. Le Blanc, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 335 days.

(21) Appl. No.: 12/443,988

(22) PCT Filed: Oct. 3, 2007

(86) PCT No.: PCT/US2007/080271
§ 371 (c)(1),
(2), (4) Date: Apr. 2, 2009

(87) PCT Pub. No.: WO2008/042942
PCT Pub. Date: Apr. 10, 2008

(65) Prior Publication Data
US 2010/0009075 A1      Jan. 14, 2010

Related U.S. Application Data

(60) Provisional application No. 60/827,947, filed on Oct. 3, 2006.

(51) Int. Cl.
*B05D 7/00* (2006.01)
(52) U.S. Cl. .................. 427/180; 427/189; 427/195
(58) Field of Classification Search .................. None
See application file for complete search history.

(56) References Cited

U.S. PATENT DOCUMENTS

| | | | |
|---|---|---|---|
| 3,635,926 A * | 1/1972 | Gresham et al. ............ | 526/206 |
| 4,029,868 A * | 6/1977 | Carlson .................... | 526/247 |
| 4,312,961 A | 1/1982 | Winegar et al. | |
| 4,675,380 A | 6/1987 | Buckmaster et al. | |
| 4,687,708 A | 8/1987 | Batzar | |
| 4,714,756 A | 12/1987 | Buckmaster | |
| 4,742,122 A | 5/1988 | Buckmaster et al. | |
| 4,743,658 A | 5/1988 | Imbalzano et al. | |
| 4,898,779 A | 2/1990 | Yoshimura et al. | |
| 4,977,221 A | 12/1990 | Yoshimura et al. | |
| 5,115,038 A | 5/1992 | Ihara et al. | |
| 5,463,006 A * | 10/1995 | Abusleme et al. ........... | 526/247 |
| 5,677,404 A * | 10/1997 | Blair ........................ | 526/247 |
| 5,688,885 A * | 11/1997 | Blair ........................ | 526/247 |
| 6,624,269 B2 * | 9/2003 | Wu et al. ................... | 526/250 |
| 6,911,512 B2 * | 6/2005 | Jing et al. .................. | 526/242 |
| 7,094,838 B2 | 8/2006 | Nakatani et al. | |
| 7,342,081 B2 * | 3/2008 | Chandler et al. ............ | 526/247 |
| 7,589,140 B2 * | 9/2009 | Chandler et al. ............ | 524/407 |
| 2005/0025900 A1 | 2/2005 | Cavero | |
| 2006/0110601 A1 | 5/2006 | Hennessey | |

FOREIGN PATENT DOCUMENTS

| | | |
|---|---|---|
| CA | 1 248 292 | 1/1989 |
| EP | 0 272 659 | 6/1988 |
| EP | 0 896 017 A1 | 2/1999 |
| GB | 1210794 | 10/1970 |
| JP | 4-272843 | 9/1992 |
| JP | 2004-175015 | 6/2004 |
| WO | 97/36952 | 10/1997 |

* cited by examiner

*Primary Examiner* — Erma Cameron

(57) ABSTRACT

A multi-layer article including a foodware substrate and a fluoropolymer composition having a copolymer consisting of from 80 to 94% by weight tetrafluoroethylene, from 6 to 20% by weight of one or more perfluorovinyl ethers of the formula $CF_2=CFO(R^a_fO)_n(R^b_fO)_mR^c_f$, where $R^a_f$ and $R^b_f$ are independently selected from linear or branched perfluoroalkylene groups of 1-6 carbon atoms, m and n are each independently 0-10 and $R^c_f$ is a perfluoroalkyl group of 1-6 carbon atoms, where when the perfluorovinyl ether content is less than 7% by weight, the fluoropolymer has an MFI of 5 or less; and/or a copolymer comprising from 80-94% by weight tetrafluoroethylene, from 5-20% by weight of a perfluorovinyl ether of the formula $CF_2=CFO(R^a_fO)_n(RbfO)_mR^c_f$ where $R^a_f$, $R^b_f$, m, n and $R^c_f$ are the same as defined above, and up to 15% by weight of one or more additional monomers based on the total weight of the fluoropolymer.

14 Claims, No Drawings

US 8,007,863 B2

MULTI-LAYER ARTICLES AND METHOD FOR IMPROVING THE RELEASE LIFE OF THE SAME

CROSS REFERENCE TO RELATED APPLICATIONS

This application is a national stage filing under 35 U.S.C. 371 of PCT/US2007/080271, filed Oct. 3, 2007, which claims priority to U.S. Provisional Application No. 60/827,947, filed Oct. 3, 2006, the disclosure of which is incorporated by reference in its/their entirety herein.

SUMMARY

The present invention relates to multi-layer articles and methods for improving the release life of foodware articles, and more particularly to fluoropolymers that are resistant to stress cracking.

The present invention relates to addressing particular problems arising through the use of fluoropolymers in multi-layer articles. The utilization of the coatings and methods described herein may increase the release life of multi-layer articles comprising a foodware substrate compared to the release life of multi-layer articles prepared using conventional fluoropolymer coatings.

In one aspect of the invention, a multi-layer article comprising a foodware substrate having a surface is provided. Also provided is a fluoropolymer composition coating the surface of the foodware substrate, the fluoropolymer composition comprises a fluoropolymer selected from (a) a copolymer consisting of from 80 to 94% by weight tetrafluoroethylene, from 6 to 20% by weight of one or more perfluorovinyl ethers of the formula $CF_2=CFO(R^a_fO)_n(R^b_fO)_mR^c_f$ wherein $R^a_f$ and $R^b_f$ are each independently selected from linear or branched perfluoroalkylene groups of 1 to 6 carbon atoms, m and n are each independently 0 to 10 and $R^c_f$ is a perfluoroalkyl group of 1 to 6 carbon atoms, wherein when the perfluorovinyl ether content is less than 7% by weight, the fluoropolymer has an MFI of 5 or less and (b) a copolymer comprising from 80 to 94% by weight tetrafluoroethylene, from 5 to 20% by weight of a perfluorovinyl ether of the formula $CF_2=CFO(R^a_fO)_n(R^b_fO)_mR^c_f$ wherein $R^a_f$ and $R^b_f$ are each independently selected from linear or branched perfluoroalkylene groups of 1 to 6 carbon atoms, m and n are each independently 0 to 10 and $R^c_f$ is a perfluoroalkyl group of 1 to 6 carbon atoms, and up to 15% by weight of one or more additional monomers based on the total weight of the fluoropolymer. As used herein, all monomer amounts are given in weight percent compared to the total weight of the polymer. By "up to 15% by weight of one or more additional monomers" is meant that one or more additional monomers is present in the fluoropolymer, but that the lower limit is not restricted.

The fluoropolymer may be bonded to the surface of the foodware substrate. Contacting the fluoropolymer to the foodware substrates may, in some embodiments, increase the release life of a multi-layer article when compared to a multi-layer article comprising a fluoropolymer composition having less stress crack resistance than the fluoropolymer of the present invention.

Without intending to be bound by theory, the applicants believe that an increase in release life correlates with an increased fluoropolymer stress crack resistance. In one aspect, this invention recognizes that release life is directly proportional to stress crack resistance and that increasing stress crack resistance, for instance in some embodiments by almost an order of magnitude over materials previously used in the art, may greatly increase the release life of a multi-layer article.

In another aspect, the present invention relates to a method comprising increasing the release life of a multi-layer article by powder coating a foodware substrate with a fluoropolymer composition. The fluoropolymer composition comprises a fluoropolymer selected from (a) a copolymer consisting of from 80 to 94% by weight tetrafluoroethylene, from 6 to 20% by weight of one or more perfluorovinyl ethers of the formula $CF_2=CFO(R^a_fO)_n(R^b_fO)_mR^c_f$ wherein $R^a_f$ and $R^b_f$ are each independently selected from linear or branched perfluoroalkylene groups of 1 to 6 carbon atoms, m and n are each independently 0 to 10 and $R^c_f$ is a perfluoroalkyl group of 1 to 6 carbon atoms, wherein when the perfluorovinyl ether content is less than 7% by weight, the fluoropolymer has an MFI of 5 or less and (b) a copolymer comprising from 80 to 94% by weight tetrafluoroethylene, from 5 to 20% by weight of a perfluorovinyl ether of the formula $CF_2=CFO(R^a_fO)_n(R^b_fO)_m R^c_f$ wherein $R^a_f$ and $R^b_f$ are each independently selected from linear or branched perfluoroalkylene groups of 1 to 6 carbon atoms, m and n are each independently 0 to 10 and $R^c_f$ is a perfluoroalkyl group of 1 to 6 carbon atoms, and up to 15% by weight of one or more additional monomers based on the total weight of the fluoropolymer.

DETAILED DESCRIPTION

The multi-layer articles of the present invention comprise a fluoropolymer. The fluoropolymers provided in the multi-layer article of the present invention may, in some embodiments, include interpolymerized units derived from tetrafluoroethylene and perfluorovinyl ether. In some embodiments, the perfluorovinyl ether is present in an amount greater than 5 percent by weight based on the total weight of the fluoropolymer. The perfluorovinyl ether may, for instance, be present in an amount from about 5 to 20 percent, 5 to 12 percent, or 5 to 7 percent, with the proviso that when the fluoropolymer is a bipolymer of tetrafluoroethylene and one perfluorovinyl ether and the perfluorovinyl ether content is below 7% by weight, the fluoropolymer has an MFI of 5 or less. That is, it has been found that, in some instances, lower perfluorovinyl ether content may lead to less stress crack resistance. In order to counteract this lower stress crack resistance, the MFI of the polymer may be lowered, which further increases the stress crack resistance of a polymer that otherwise contains a similar amount of perfluorovinyl ether. The MFI control may be accomplished by means known in the art such as, for instance, adjusting the molecular weight of the polymer. The amount of perfluorovinyl ether may also vary with the number of carbon atoms in the perfluorovinyl ether. That is, a perfluorovinyl ether having more carbon atoms may be present in a lower amount than a perfluorovinyl ether having fewer carbon atoms.

In some embodiments, the perfluorovinyl ethers include those of the formula $CF_2=CF-O-R_f$ wherein $R_f$ represents a perfluorinated aliphatic group that may contain one or more oxygen atoms. Other embodiments include perfluorovinyl ethers of the formula $CF_2=CFO(R^a_fO)_n(R^b_fO)mR^c_f$ wherein $R^a_f$ and $R^b_f$ are each independently selected from linear or branched perfluoroalkylene groups of 1 to 6 carbon atoms, in particular 2 to 6 carbon atoms, m and n are each independently 0 to 10 and $R^c_f$ is a perfluoroalkyl group of 1 to 6 carbon atoms. In some embodiments $R^c_f$ is a perfluoroalkyl group of 2 to 6 carbon atoms. Specific examples of perfluorovinyl ethers include perfluoro(methyl vinyl) ether, perfluoro(n-propyl vinyl) ether, perfluoro(2-methoxyethyl vinyl) ether, and $CF_3(CF_2)_2$—O—$CF(CF_3)CF_2$—O—$CF(CF_3)$—$CF_2$—CF=$CF_2$. Some of the aforementioned perfluorovinyl ethers will be liquid under the conditions of polymerization and thus are non-gaseous fluorinated monomers. In some embodiments, a combination of two or more perfluorovinyl ethers may be present in the fluoropolymer.

In some embodiments, the fluoropolymers include a copolymer comprising from 80 to 94% by weight tetrafluoroethylene, from 5 to 20% by weight perfluorovinyl ether, and up to 15% by weight of one or more additional monomers based on the total weight of the fluoropolymer.

The fluoropolymer compositions may comprise one or more fluoropolymers of which one or more may be selected from the class described above. In some embodiments, the fluoropolymer compositions comprise further polymers such as, for instance, polytetrafluoroethylene (PTFE). In particular embodiments, the amount of PTFE may be below 50% by weight of the fluoropolymer compositions based on the total weight of the fluoropolymers, less than 30% by weight, less than 10% by weight, less than 5% by weight, or even less than 1% by weight. In further embodiments, the fluoropolymer compositions contain no PTFE.

The melting point of the fluoropolymers described herein decreases as the level of interpolymerized monomers other than TFE is increased. As the level of interpolymerized monomers is increased further, more than one melt peak may become evident by differential scanning calorimetry. Often the additional melt peaks occur at temperatures above the desired melt peak temperature. In some embodiments, the fluoropolymers described have melt peaks below 300° C., which can have end-of-melting points above 300° C. In particular embodiments, there are no melt peaks above 300° C. That is, in particular embodiments, the fluoropolymers described herein have major melt peaks below 300° C., or even below about 290° C., and above about 270° C., or even above about 280° C.

The melt flow index of the fluoropolymer ("MFI") is not particularly limited. In some embodiments, for instance, the MFI may be from greater than 1, greater than 2, greater than 5, or even greater than 10. The MFI may be, for instance, less than 20, less than 15, less than 10, less than 5, or even less than 4. Whenever reference is made to MFI herein, the values reported are measured at 372° C. using a 5 kg weight according to ASTM D-1238. One skilled in the art would recognize that the MFI may be optimized to give good stress crack resistance (lower MFI) and smooth coatings (higher MFI), depending upon the particular application.

The fluoropolymers provided in the multi-layer article of the present invention may further include units derived from one or more additional monomers in an amount of up to 15%. For instance, the one or more additional monomers may be present in an amount of from 0.1 to 15% by weight, from 0.5 to 10% by weight, from 0.5 to 5% by weight, or even from 1 to 3% by weight. Additional monomers include fluorinated monomers such as, for instance, hexafluoropropylene, hexafluoropropylene oxide, trifluoroethylene, chlorotrifluoroethylene, vinyl fluoride, and vinylidene fluoride. Additional monomers also include, for instance, non-fluorinated monomers such as C2 to C9 α-olefins (e.g., ethylene and propylene). Perfluorinated polymers, in particular, those for which the additional monomer is hexafluoropropylene, are particularly suited to the present invention.

The fluoropolymers provided in the multi-layer articles of the present invention may be prepared by traditional polymerization methods. These include, for example, solution polymerization, aqueous emulsion polymerization, and suspension polymerization.

In some embodiments, the fluoropolymers have a volume average particle size from about 10 to 100 microns. In one aspect of the present invention, the fluoropolymers may be in powder form. Fluoropolymer powders can be used, for instance, as a powdered paint.

In yet further embodiments, the fluoropolymers described herein are resistant to stress cracking. This property can be evaluated by bending a fluoroplastic sample around a small radius and then exposing them to a stress cracking agent in an environment known to cause stress cracking.

Stress cracking agents are those materials known to contribute to stress cracking. Such agents include, for example, alkanes such as iso-octane, lower alcohols such as methanol, and surfactants such as fluorinated surfactants and fluids including surfactants. The activity of these agents may be accelerated, for instance, by increasing the temperature to which the fluoropolymer is exposed and/or increasing the concentration of the stress cracking agent.

The environment known to cause stress cracking may be the actual conditions to which a final article may be exposed. The environment may be made more severe for accelerated testing purposes, such as by increasing temperature, using a more concentrated or more aggressive stress cracking agent, and/or increasing the stress applied to the article.

Increasing flexural fatigue strength ("flex life") correlates well with increasing stress crack resistance. In testing this property, a film strip is weighted and then flexed through an angle of 135° at a frequency of around 250 double flexures (back and forth) per minute until the strip breaks. The number of cycles until break is recorded as flex life. More detailed information on this procedure can be found in ASTM D-2176 (97a).

In another aspect of the present invention, a fluoropolymer powder can be utilized to form a processed and coated film on a foodware substrate. In order to obtain a smooth surface, the particles of the powder paint may be high in apparent density, and may have excellent fluidity.

In yet a further aspect of the present invention, reducing the number of unstable endgroups per million carbon atoms may increase initial release properties of the multi-layer article as well as release life. By "unstable endgroup" it is meant groups at the end of a polymer chain that evolve HF, by any process, for instance, by oxidation, hydrolysis, thermal decomposition, or any combination thereof. Such endgroups include, for example, —COOH, —COF, $CONH_2$, and $CF_2CH_2OH$. The reduction in the number of unstable endgroups (for instance, by "post-fluorination") can be achieved. Post fluorination includes contacting the polymer with fluorine gas under conditions sufficient to remove all or nearly all unstable end groups, and further, reducing the extractable fluorine content to a low level. The resulting fluoropolymers may have 80 or fewer unstable endgroups per million carbon atoms, 20 or fewer unstable endgroups per million carbon atoms, or may be essentially free of unstable endgroups. By "essentially free" it is meant having 5 or fewer unstable endgroups per million carbon atoms. Preferably, post-fluorination is carried out on perfluorinated polymers, although it is also contemplated herein that post-fluorination may be carried out on non-perfluorinated fluoropolymers. Further, when describing a fluoropolymer as having "stable endgroups" as used in this application is meant fluoropolymers having 80 or fewer unstable endgroups per million carbon atoms.

Additives compounding can be incorporated into the compositions, such as carbon black, stabilizers, plasticizers, pigments, lubricants, fillers, levelling agents, primers, adhesion aids, additional fluoropolymers (including one or more fluoropolymer as described above), and processing aids typically utilized in fluoropolymer.

The multi-layer articles described herein may be used to provide a foodware article with an increased release life of the foodware article when compared to a foodware article having a substrate powder coated with a fluoropolymer composition that contains a fluoropolymer having a lower stress crack resistance than those described herein. The present description recognizes that an increased released life correlates with an increased stress crack resistance for the fluoropolymer composition. Accordingly, in another embodiment, the present invention relates to adding materials to the fluoropolymer compositions described herein, wherein the added materials increase the stress crack resistance of the fluoropolymer composition compared to a fluoropolymer composition without the additional materials.

When the fluoropolymer composition forms a layer on the foodware substrate in the multi-layer article of the present invention, any thickness of the fluoropolymer composition layer can be employed without departure from the present description. For instance, the fluoropolymer layer may be from about 5 to 5000 microns thick. In another aspect, the fluoropolymer composition layer may be from about 5 to 1000 microns thick.

A number of foodware substrates may be used in the present invention. Appropriate substrates include, for instance, fry pans, rice cookers, grills, and bakeware. The multi-layer articles of the present invention are particularly suited for use as bakeware.

The foodware substrate may comprise any of a number of materials. Appropriate materials may be selected according to the end-use to which it will be put, considering, for instance, the necessity for resistance to temperature, corrosion, chemical environment, pressure, or any other processing condition. Suitable materials include, for instance, glass, tempered glass, aluminum, steel, stainless steel, or glass-lined steel. Particularly suited materials include 316 L stainless steel, aluminum, aluminum-clad steel, and low coefficient of expansion-type glass.

The multi-layer articles of the present invention may comprise a foodware substrate layer, a fluoropolymer composition layer, and optionally any additional layer or layers. Additional layers may comprise, for instance, insulators and/or adhesives.

In another aspect, the present invention relates to a method for increasing the release life of coated bakeware comprising coating a bakeware substrate with a fluoropolymer composition selected from (a) a copolymer consisting of from 80 to 94% by weight tetrafluoroethylene, from 6 to 20% by weight of one or more perfluorovinyl ethers of the formula $CF_2=CFO(R^a_fO)_n(R^b_fO)_m R^c_f$ wherein $R^a_f$ and $R^b_f$ are each independently selected from linear or branched perfluoroalkylene groups of 1 to 6 carbon atoms, m and n are each independently 0 to 10 and $R^c_f$ is a perfluoroalkyl group of 1 to 6 carbon atoms, wherein when the perfluorovinyl ether content is less than 7% by weight, the fluoropolymer has an MFI of 5 or less (b) a copolymer comprising from 80 to 94% by weight tetrafluoroethylene, from 5 to 20% by weight of a perfluorovinyl ether of the formula $CF_2=CFO(R^a_fO)_n(R^b_fO)_m R^c_f$ wherein $R^a_f$ and $R^b_f$ are each independently selected from linear or branched perfluoroalkylene groups of 1 to 6 carbon atoms, m and n are each independently 0 to 10 and $R^c_f$ is a perfluoroalkyl group of 1 to 6 carbon atoms, and up to 15% by weight of one or more additional monomers based on the total weight of the fluoropolymer. The fluoropolymer layer may, in some embodiments, be from about 5 to 5000 microns thick.

Bakeware, which is a type of foodware, provides a baking surface and optionally a form, which may be in the shape of an indentation that holds dough or batter to intended shape. The baking surface may also be a flat surface. Bakeware surfaces have a limited release life because baked goods eventually begin to stick onto the bakeware. The release life of a bakeware article can be quantified by counting the number of bake cycles. Each time batter or dough is added to the bakeware article, baked, and removed from the bakeware article counts as one bake cycle. The bake cycle for each type of baked good may also have additional steps such as proofing to get the dough to rise. The number of bake cycles is counted until the removal of baked goods from the bakeware article becomes practically difficult on a percentage basis (which will vary depending on the bakery). When the percentage of articles that fail to release exceeds a certain tolerance limit, the bakeware article is removed from the bake system and a new set of bakeware articles is introduced.

In order to determine the cause of end of life failure, valuations were performed by the present inventors on bakeware articles having a perfluorovinyl ether content that was lower than those described herein and that had exceeded their useful life. The bakeware articles had not lost fluoropolymer thickness, did not display significant surface scratching, and retained relatively strong bonding to the substrate. It was observed, however, that pans that had reached their practical end of life had undergone a color change.

Upon observation under a scanning electron microscope (SEM), there were many small deposits. Using SEM/EDXA (Energy Dispersive X-ray Analysis) it was determined that the deposits were primarily carbon. It was further shown that when a tensile stress was applied to the coating by bending the coated metal with a one-inch radius, the coating cracked. The cracks appear like mud cracks when viewed under an optical microscope. The coatings, however, maintained adhesion to the substrate. New bakeware article coatings show none of the cracking behavior. It was reasoned that the carbon deposits were formed as oils, sugars, and other dough or batter ingredients stuck to higher surface energy regions on the fluoropolymer surface. The high surface energy regions were likely to be either cracks (exposing the underlying materials) or other surface contaminants where dough and batter components stuck and eventually carbonized over repeated bake cycles. The carbonized growth provided a further high surface energy region that may have attracted additional ingredients with each bake cycle. Thus, the present inventors determined that, at least in some embodiments, the major mode of failure of bakeware articles was loss of release life due to stress cracking of the fluoropolymer coating.

Objects and advantages of the present description are further illustrated by the following examples. The particular materials and amounts thereof recited in the examples, as well as other conditions and details, should not be construed to unduly limit the claimed invention.

EXAMPLES

Folding Endurance Test Method

The folding endurance test is an adaptation of ASTM D 2176-97a Standard Test Method for Folding Endurance of Paper by the M.I.T. Tester. The tests were carried out according to the general method described in ASTM D 2176 while using the following specific adapted conditions and the reported number of folds is an average of multiple measurements.

TABLE 1

| Test Condition | Adapted Value |
|---|---|
| Folding head size | 0.020 in. |
| Folding Rate | 175 folds/minute |
| Folding Angle | 135 degrees |
| Sample Film Size | 10 cm × 1.25 cm × 0.25 cm (tested both parallel and perpendicular to the direction of extrusion) |

TABLE 2

| Sample | Fluoropolymer Identification | Folding Endurance Results |
|---|---|---|
| Example 1 | PFA (5.5% perfluoropropylvinyl ether, 2.0% hexafluoropropylene, balance tetrafluoroethylene) MFI = 2 Stable endgroups | Parallel Folds 897,938 Perpendicular Folds 745,748 |
| Example 2 | PFA (5.5% perfluoropropylvinyl ether, 2.0% hexafluoropropylene, balance tetrafluoroethylene) MFI = 15 Stable endgroups | Parallel Folds 183,252 Perpendicular Folds 141,526 |
| Comparative Example 3 | PFA (4% perfluoropropylvinyl ether, balance tetrafluoroethylene) MFI = 2 | Parallel Folds 92,705 Perpendicular Folds 103,838 |
| Comparative Example 4 | FEP (14% hexafluoropropylene, balance tetrafluoroethylene) MFI = 7 | Parallel Folds 18,098 Perpendicular Folds 23,415 |

Frank Gadget Test Method

The flexural fatigue test carried out under this method was accomplished by submitting a compression-molded sample that was 1 mm thick to a folding test that was carried out using a tensile load of 1 MPa, according to DIN 53442. This flexural fatigue testing enabled a qualitative assessment to be made of the behavior of plastics subjected to alternating stress. The dimensions of the test pieces, the method used to prepare them, and the conditions under which they were tested may considerably influence the results of fatigue testing. As a rule, data deriving from this test can only be applied qualitatively amongst similarly prepared samples. The results reported were the average of multiple measurements.

TABLE 3

| Sample | Fluoropolymer Identification | Folding Endurance Results |
|---|---|---|
| Example 5 | PFA (5.5% perfluoropropylvinyl ether, 2.0% hexafluoropropylene, balance tetrafluoroethylene) MFI = 2 Stable endgroups | ~120,000 Folds |
| Example 6 | PFA available commercially from DuPont as "950 HP" (7-10% PEVE, balance tetrafluoroethylene) MFI = 2 Stable endgroups | ~100,000 Folds |
| Example 7 | PFA (5.5% perfluoropropylvinyl ether, 2.0% hexafluoropropylene, balance tetrafluoroethylene) MFI = 15 Stable endgroups | <5,000 Folds |
| Comparative Example 8 | PFA (6% perfluoropropylvinyl ether, balance tetrafluoroethylene) MFI = 6 | <5,000 Folds |
| Comparative Example 9 | PFA (4% perfluoropropylvinyl ether, balance tetrafluoroethylene) MFI = 5 | <5,000 Folds |
| Comparative Example 10 | PFA (4% perfluoropropylvinyl ether, balance tetrafluoroethylene) MFI = 15 | <1,000 Folds |

From the above disclosure of the general principles of the present invention and the preceding detailed description, those skilled in this art will readily comprehend the various modifications to which the present invention is susceptible. Therefore, the scope of the invention should be limited only by the following claims and equivalents thereof.

What is claimed is:

1. A method of increasing the release life of a multi-layer article comprising powder coating a foodware substrate with a fluoropolymer composition comprising a fluoropolymer selected from:
   (a) a copolymer consisting of from 80 to 94% by weight tetrafluoroethylene, from 6 to 20% by weight of one or more perfluorovinyl ethers of the formula $CF_2=CFO(R^a_fO)_n(R^b_fO)_mR^c_f$ wherein $R^a_f$ and $R^b_f$ are each independently selected from linear or branched perfluoroalkylene groups of 1 to 6 carbon atoms, m and n are each independently 0 to 10 and $R^c_f$ is a perfluoroalkyl group of 1 to 6 carbon atoms, wherein when the copolymer is a bipolymer of tetrafluoroethylene and one perfluorovinyl ether and the perfluorovinyl ether content is less than 7% by weight, the fluoropolymer has an MFI of 5 or less; and
   (b) a copolymer comprising from 80 to 94% by weight tetrafluoroethylene, from 5 to 20% by weight of a perfluorovinyl ether of the formula $CF_2=CFO(R^a_fO)_n(R^b_fO)_mR^c_f$ wherein $R^a_f$ and $R^b_f$ are each independently selected from linear or branched perfluoroalkylene groups of 1 to 6 carbon atoms, m and n are each independently 0 to 10 and $R^c_f$ is a perfluoroalkyl group of 1 to 6 carbon atoms, and up to 15% by weight of one or more additional monomers based on the total weight of the fluoropolymer.

2. The method of claim 1 wherein the fluoropolymer comprises less than 94% tetrafluoroethylene.

3. The method of claim 1 wherein the fluoropolymer composition comprises less than 50% by weight polytetrafluoroethylene.

4. The method of claim 3 wherein the fluoropolymer composition is free of polytetrafluoroethylene homopolymer.

5. The method of claim 1 wherein the fluoropolymer has a melting point of less than 300° C.

6. The method of claim 1 wherein the fluoropolymer has a melting point of greater than 270° C.

7. The method of claim 1 wherein the fluoropolymer comprises two or more perfluorovinyl ethers.

8. The method of claim 1 wherein the fluoropolymer contains a perfluorovinyl ether selected from perfluoro(ethyl vinyl) ether; perfluoro(propyl vinyl) ether; perfluoro(methyl vinyl) ether; and combinations thereof.

9. The method of claim 1 wherein the additional monomer is hexafluoropropylene.

10. The method of claim 1 wherein the fluoropolymer has an MFI of 5 or less.

11. The method of claim 1 wherein the fluoropolymer has fewer than 80 unstable endgroups per million carbon atoms.

12. The method of claim 1 wherein the fluoropolymer has fewer than 20 unstable endgroups per million carbon atoms.

13. The method of claim 1 wherein the fluoropolymer has fewer than 5 unstable endgroups per million carbon atoms.

14. The method of claim 1 wherein the fluoropolymer comprises tetrafluoroethylene, perfluoro(propyl vinyl) ether, and hexafluoropropylene.

\* \* \* \* \*

UNITED STATES PATENT AND TRADEMARK OFFICE
CERTIFICATE OF CORRECTION

PATENT NO. : 8,007,863 B2  Page 1 of 1
APPLICATION NO. : 12/443988
DATED : August 30, 2011
INVENTOR(S) : Blake E Chandler It is certified that error appears in the above-identified patent and that said Letters Patent is hereby corrected as shown below:

On the Title Page:

Item (57) Abstract, line 13, please delete "(RbfO)" and insert in place thereof --$(R^b_f O)$--.

Signed and Sealed this
First Day of November, 2011

David J. Kappos
*Director of the United States Patent and Trademark Office*